(12) United States Patent
Abe

(10) Patent No.: US 7,880,773 B2
(45) Date of Patent: Feb. 1, 2011

(54) IMAGING DEVICE

(75) Inventor: Nobuaki Abe, Saitama (JP)

(73) Assignee: Hoya Corporation, Tokyo (JP)

( * ) Notice: Subject to any disclaimer, the term of this patent is extended or adjusted under 35 U.S.C. 154(b) by 269 days.

(21) Appl. No.: 11/860,021

(22) Filed: Sep. 24, 2007

(65) Prior Publication Data
US 2008/0252738 A1 Oct. 16, 2008

(30) Foreign Application Priority Data
Sep. 27, 2006 (JP) ............... 2006-263291

(51) Int. Cl.
H04N 9/73 (2006.01)
(52) U.S. Cl. ............... 348/223.1; 348/224.1; 348/225.1; 348/272; 348/273
(58) Field of Classification Search ............... 348/223.1, 348/224.1, 225.1, 272, 273; 358/505, 512, 358/515, 518; 359/502, 891
See application file for complete search history.

(56) References Cited

U.S. PATENT DOCUMENTS

| | | | |
|---|---|---|---|
| 5,063,439 A | 11/1991 | Tabei | |
| 5,187,569 A | 2/1993 | Tani | |
| 5,497,246 A | 3/1996 | Abe | |
| 5,745,171 A | 4/1998 | Ogawa et al. | |
| 5,886,790 A | 3/1999 | Abe | |
| 6,184,925 B1 | 2/2001 | Abe et al. | |
| 6,900,833 B2 | 5/2005 | Abe | |
| 7,046,277 B2 | 5/2006 | Abe | |
| 7,106,341 B2 | 9/2006 | Abe | |
| 7,148,920 B2 * | 12/2006 | Aotsuka ............... 348/223.1 |
| 7,183,530 B2 | 2/2007 | Abe | |
| 7,489,346 B2 | 2/2009 | Mizukura et al. | |
| 2005/0280727 A1 | 12/2005 | Sato et al. | |
| 2006/0082665 A1 | 4/2006 | Mizukura et al. | |
| 2006/0222324 A1 | 10/2006 | Abe | |

FOREIGN PATENT DOCUMENTS

| | | |
|---|---|---|
| JP | 2872759 | 1/1999 |
| JP | 2002-271804 | 9/2002 |
| JP | 2003-284084 | 10/2003 |
| JP | 2004-200357 | 7/2004 |
| JP | 2004-208079 | 7/2004 |
| JP | 2004-228662 | 8/2004 |

OTHER PUBLICATIONS

Japan Office action, dated Oct. 2010, along with an English translation thereof.

* cited by examiner

Primary Examiner—Yogesh K Aggarwal
(74) Attorney, Agent, or Firm—Greenblum & Bernstein, P.L.C.

(57) ABSTRACT

An imaging device has an image sensor, and a color filter. The color filter is located on the image sensor and has at least four color elements that respectively have different spectral transmission properties. Further, the imaging device has a matrix-selection processor and a color conversion processor. The matrix-selection processor detects the spectral distribution properties of an object that are present in the series of color signals. Then, the matrix-selection processor selects one color matrix appropriate for the detected spectral distribution property from a plurality of color matrices according to the particular spectral distribution properties of a given object. The color-conversion processor generates R, G, and B primary color signals from the series of color signals by a color-conversion process using the selected color matrix.

10 Claims, 8 Drawing Sheets

IMAGING DEVICE

BACKGROUND OF THE INVENTION

1. Field of the Invention

The present invention relates to an imaging device incorporated into electronic equipment such as a digital still/video camera, a cellular phone, and so on. Especially, it relates to a signal process associated with color reproduction.

2. Description of the Related Art

In an imaging device, a primary color filter such as an R, G, and B color filter or a complementary color filter such as a Ye, CY, Mg, and G color filter is arranged on a photo-sensitive area of an image sensor. In the color filter, color elements are arranged in a checkered configuration such that the color elements are opposite pixels arranged in the photo sensitive area. Light, reflected off an object, passes through the color filter so that image-pixel signals, which are composed of color signals corresponding to the color elements, are generated. The image-pixel signals are subjected to a color conversion process, namely, a matrix computation which produces image signals dependent upon a given standard color space defined through the colorimetry. Consequently, video signals such as NTSC signals are output to a peripheral apparatus such as a monitor.

In a digital camera, various arrangements of the color elements and various color-conversion processes have been attempted in order to accurately reproduce an objective color as accurately as possible, namely, to reproduce the objective colors so as to match those perceived in real life as closely as possible. For example, a color element G', which has a relative spectral transmission property or characteristic close to that of a given Green color element (G), may be arranged in the color filter in place of the Green color element G, in order to correct for a biased red color signal. In a different approach, the color filter is composed of four color elements, R, G, B, plus an additional color element that has a different spectral transmission property. In this case, R, G, and B primary color signals, corresponding to tristimulus values, are generated by a 4×3 matrix computation. The four color elements reproduce an objective color while reducing noise.

However, since the relative spectral-transmission properties of color filter do not necessarily coincide with the visual relative response property, an adequate reproduction of the objective color is difficult.

SUMMARY OF THE INVENTION

An object of the present invention is to provide an imaging device that is capable of accurately reproducing any color of a photographed object.

An imaging device according to the present invention has an image sensor, and a color filter. The color filter is located on the image sensor and has at least four color elements that respectively have different spectral transmission properties. A series of color signals corresponding to the at least four color elements is read from the image sensor. Further more, the imaging device according to the present invention has a matrix-selection processor and a color-conversion processor. The matrix-selection processor detects the spectral distribution properties of an object included in the series of color signals. The spectral distribution properties are included or present in the series of color signals. Then, the matrix-selection processor selects one color matrix corresponding to the detected spectral distribution properties from a plurality of color matrices. The plurality of color matrices corresponds to and is chosen for objects with different respective spectral distribution properties. The selected color matrix is appropriate for the detected spectral distribution properties. Then, the color conversion processor generates R, G, and B primary color signals from the series of color signals by a color-conversion process using the selected color matrix.

An apparatus for converting color signals according to another aspect of the present invention has a spectral distribution property detector that detects the spectral distribution properties of an object that are present in the series of color signals, a matrix selector that selects one color matrix corresponding to the detected spectral distribution properties from a plurality of color matrices, and a color conversion processor that generates R, G, and B primary color signals from the series of color signals by a color conversion process using the selected color matrix.

A method for converting color signals according to another aspect of the present invention includes: a) detecting the spectral distribution properties of an object that are present in a series of color signals; b) selecting one color matrix corresponding to the detected spectral distribution properties from a plurality of color matrices; and c) generating R, G, and B primary color signals from the series of color signals by a color conversion process using the selected color matrix.

BRIEF DESCRIPTION OF THE DRAWINGS

The present invention will be better understood from the description of the preferred embodiments of the invention set forth below together with the accompanying drawings, in which.

DESCRIPTION OF THE PREFERRED EMBODIMENTS

Hereinafter, the preferred embodiments of the present invention are described with reference to the attached drawings.

Figure 1:
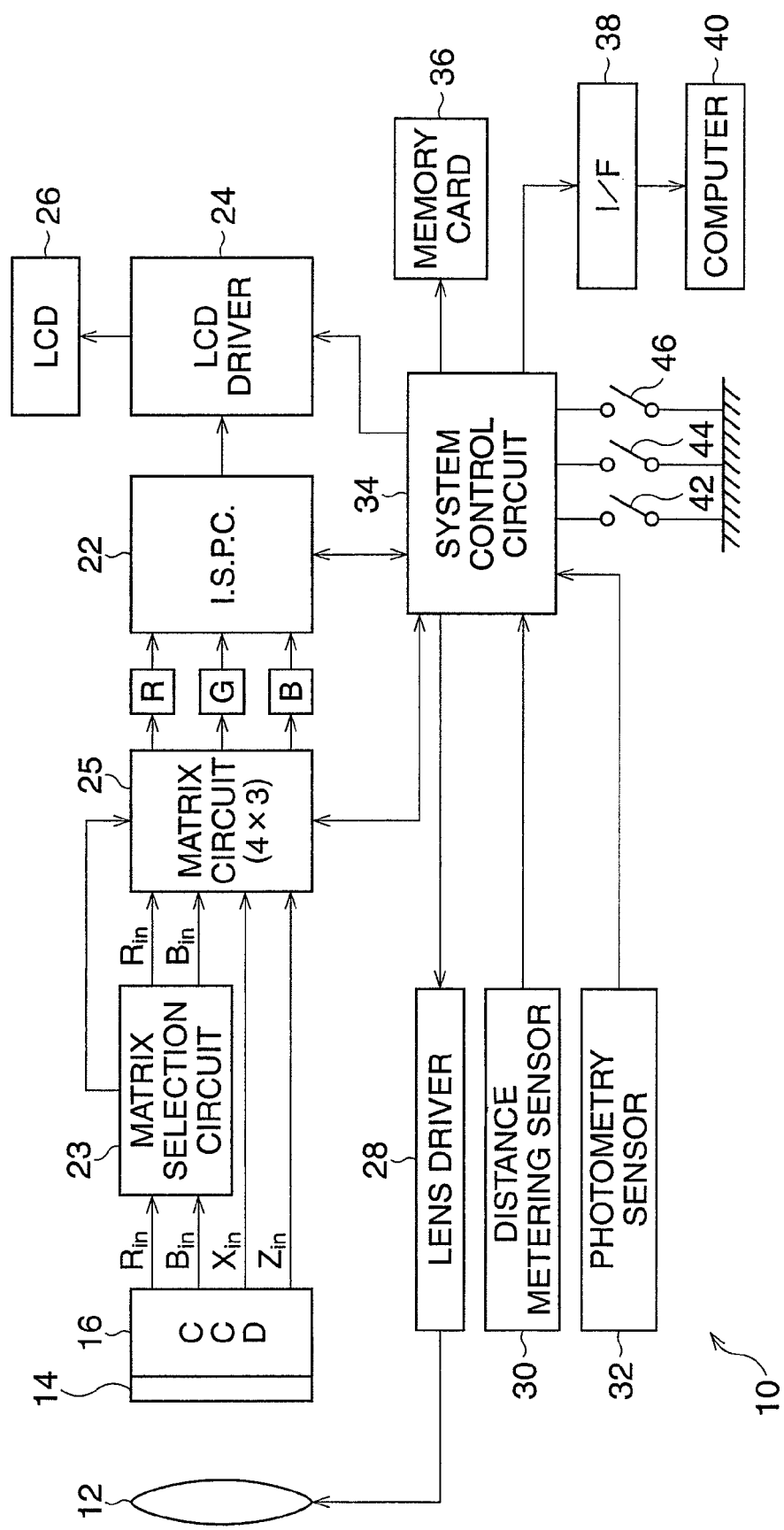
FIG. 1 is a block diagram of a digital camera according to a first embodiment.

FIG. 1 is a block diagram of a digital camera according to a first embodiment.

A digital camera 10 has a photographing optical system 12 and a CCD 16. Light, reflected from an object, passes through the photographing optical system 12 and an infrared light cut-off filter (not shown), and reaches the photo sensitive area of the CCD 16, so that an object image is formed on the photo-sensitive area. Herein, a color imaging method using a so-called "on-chip color filter" is applied as an imaging process. A color filter 14, checkered with four color elements R0, X, Z, and B0, is arranged on the photo sensitive area such that the four color elements are opposite pixels arranged in the photosensitive area. The color elements "R0" and "B0" respectively correspond to the color Red (R) and the color Blue (B). On the other hand, the color elements X and Z correspond to the color Green (G).

In the CCD 16, a series of color signals $R_{in}$, $B_{in}$, $X_{in}$, and $Z_{in}$, corresponding to the color elements R0, X, Z, and B0, are generated. The series of color signals are then read from the CCD 16 in accordance with clock pulse signals fed from a CCD driver (not shown). The series of color signals are amplified in an initial processing circuit (not shown) and subjected to given processes.

Partial color signals $R_{in}$ and $B_{in}$ are fed to a matrix circuit 25 via a matrix-selection circuit 23. In the matrix-selection circuit 23, the spectral distribution property (spectral reflection ratio) of a photographed object is detected on the basis of the input color signals $R_{in}$ and $B_{in}$. On the other hand, the remaining image-pixel color signals $X_{in}$ and $Z_{in}$ are fed directly to the matrix circuit 25.

In the matrix circuit 25, a 4×3 matrix conversion process is carried out on the input color signals. As described later, a plurality of color matrices is prepared in advance, and one color matrix, appropriate for the detected spectral distribution properties, is selected from the plurality of matrices to carry out the color conversion process. Consequently, R, G, and B primary color signals corresponding to tristimulus values are generated, and fed to an image-signal processing circuit 22.

In the image-signal processing circuit 22, the R, G, and B primary color signals are subjected to various processes such as white balance adjustment, gamma correction, and so on. Consequently, video signals are generated according to a standard sRGB color space. The "sRGB" color space, which is the default standard color space for a digital camera, is applied to correctly reproduce colors on the basis of a standard monitor and a standard visual environment. The video signals are fed to an LCD driver 24, which drives an LCD 26 on the basis of the video signals. Thus, an object image is displayed on the LCD 26 as a moving image.

When the release button (not shown) is depressed halfway and a half-depression switch 42 is turned ON, the distance from the camera 10 to a target object is measured by a distance-metering sensor 30, and the brightness of the object is measured by a photometry sensor 32. In a system control circuit 34, exposure values, namely, shutter speed and F number are calculated on the basis of the measured brightness of the object. Also, the photographing optical system 12 is driven by a lens-driving circuit 28 so as to focus the object, in accordance with the measured distance. When the release button is fully depressed and a full-depression switch 44 is turned ON, a shutter and an iris (not shown) are driven so as to generate one frame's worth of image-pixel signals. The image-pixel signals are then processed in the matrix circuit 25 and the image-signal processing circuit 22. Then, image data are compressed in the system control circuit 34, and the compressed image data is recorded on a memory card 36. When a transmission button (not shown) is operated and a transmission switch 46 is turned ON, the recorded image data is output to a computer 40 via an I/F circuit 38.

The system control circuit 34, including a CPU, a RAM, and a ROM, outputs control signals to other circuits to control the camera 10. Data associated with the plurality of color matrices is stored in the ROM in advance, and the matrix data is temporarily stored in a register of the matrix circuit 25 when the electric power is turned on. Based on information associated with the spectral distribution properties of the object, the matrix-selection circuit 25 outputs control signals to the matrix circuit 25 to select one color matrix. The matrix circuit 25 carries out the matrix-conversion process with the selected color matrix.

Figure 2:
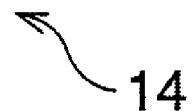
FIG. 2 is a view showing a part of the color filter.
Figure 3:
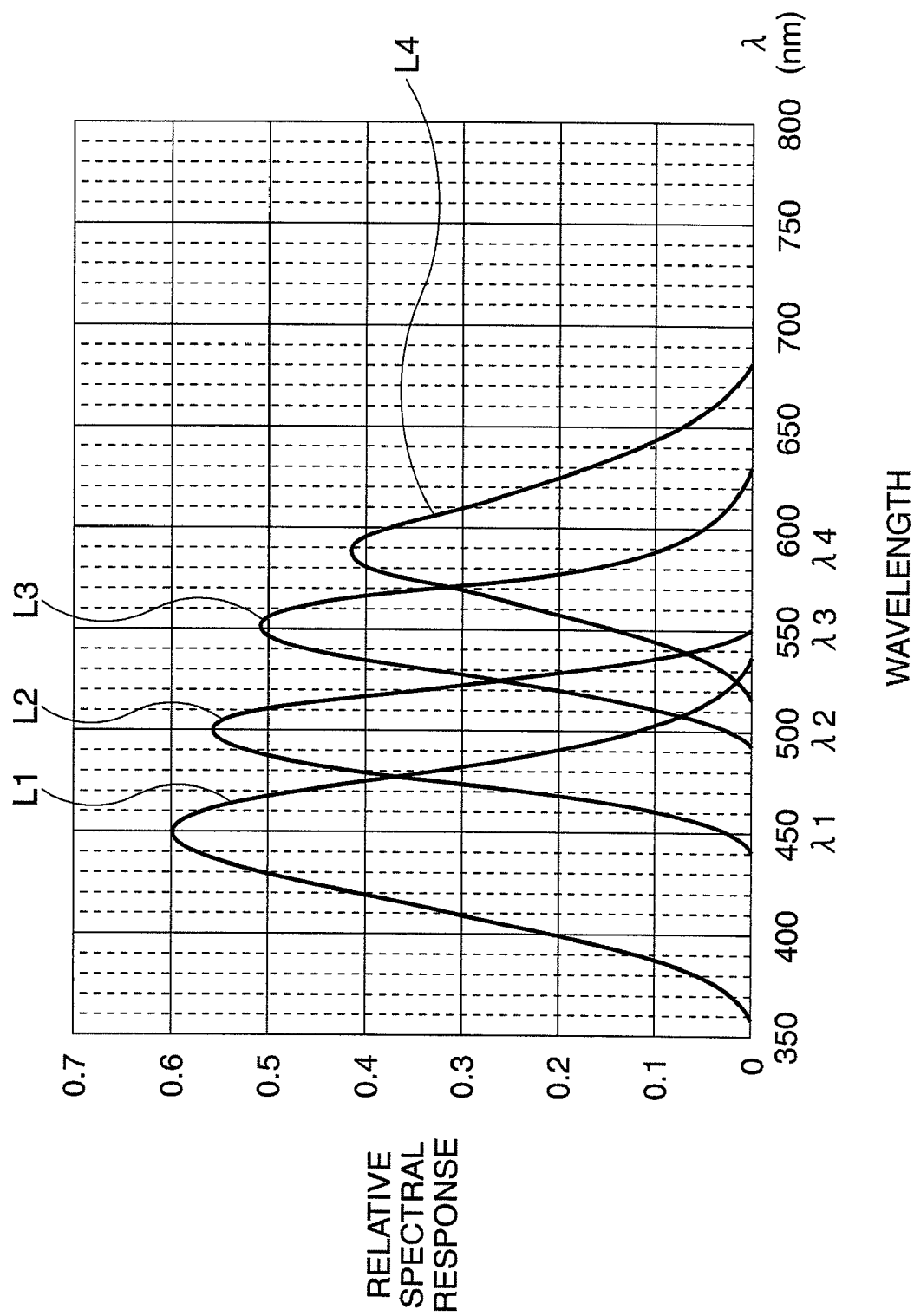
FIG. 3 is a view showing the relative spectral response or sensitivity properties of the input system.

FIG. 2 is a view showing a part of the color filter 14. FIG. 3 is a view showing the relative spectral response or sensitivity properties of an input system, namely, an imaging device according to the digital camera 10. The four color elements in the color filter 14 are explained with reference to FIGS. 2 and 3.

As shown in FIG. 2, the color filter 14 is a Bayer array type filter, and the color filter 14 is formed by regularly arranging a plurality of blocks "B"; each block composed of the four color elements R0, X, Z, and B0. The color element B0 transmits light having a relatively short wavelength corresponding to the color Blue, and the color element "R0" transmits light having a relatively long wavelength corresponding to the color Red. On the other hand, the color element X transmits light with a wavelength between Blue and Green, and the color element "Z" transmits light having a wavelength between Green and Red. The four color elements B0, X, Z, and R0 are arranged in a checkered array such that each element is opposite a corresponding pixel in the photo sensitive area of the CCD 16. The series of color signals $R_{in}$, $B_{in}$, $X_{in}$, and $Z_{in}$ are processed in each of these four-pixel blocks, here designated block type "B".

In FIG. 3, the spectral response distribution of the input system is shown. The spectral response distribution is a combination of the spectral transmission property of the color filter 14, the spectral response distribution property of the photographing optical system 12 including the infrared cut-off filter, and the spectral response distribution properties of the CCD 16. The spectral response distribution properties of the input system is substantially characterized by the spectral transmission properties of the color filter 14 (namely, the four color elements B0, X, Z, R0), and is generally represented by four Gaussian distributions. Spectral distribution curves are herein designated L1, L2, L3, and L4, which correspond to the color elements B0, X, Z, and R0, respectively. Herein, the spectral response distribution curves L1, L2, L3, and L4 have peak wavelengths $\lambda 1$ (=450 nm), $\lambda 2$ (=500 nm), $\lambda 3$ (=550 nm), and $\lambda 4$ (=590 nm), respectively.

The spectral distribution curve L1 mainly corresponds to the Blue light component, and the range of its spectral distribution is between 360 nm and 540 nm. The spectral distribution curve L4 mainly corresponds to the Red light component, and the range of its spectral distribution is between 520 nm and 680 nm. The spectral distributions L2 and L3 fall between the spectral distribution L1 and the spectral distribution L4 such that the neighboring spectral distributions are equally spaced. The curves of the spectral distributions L1, L2, L3, and L4 are defined such that the peak wavelengths $\lambda 1$, $\lambda 2$, $\lambda 3$, and $\lambda 4$ occur at equal intervals.

Figure 4:
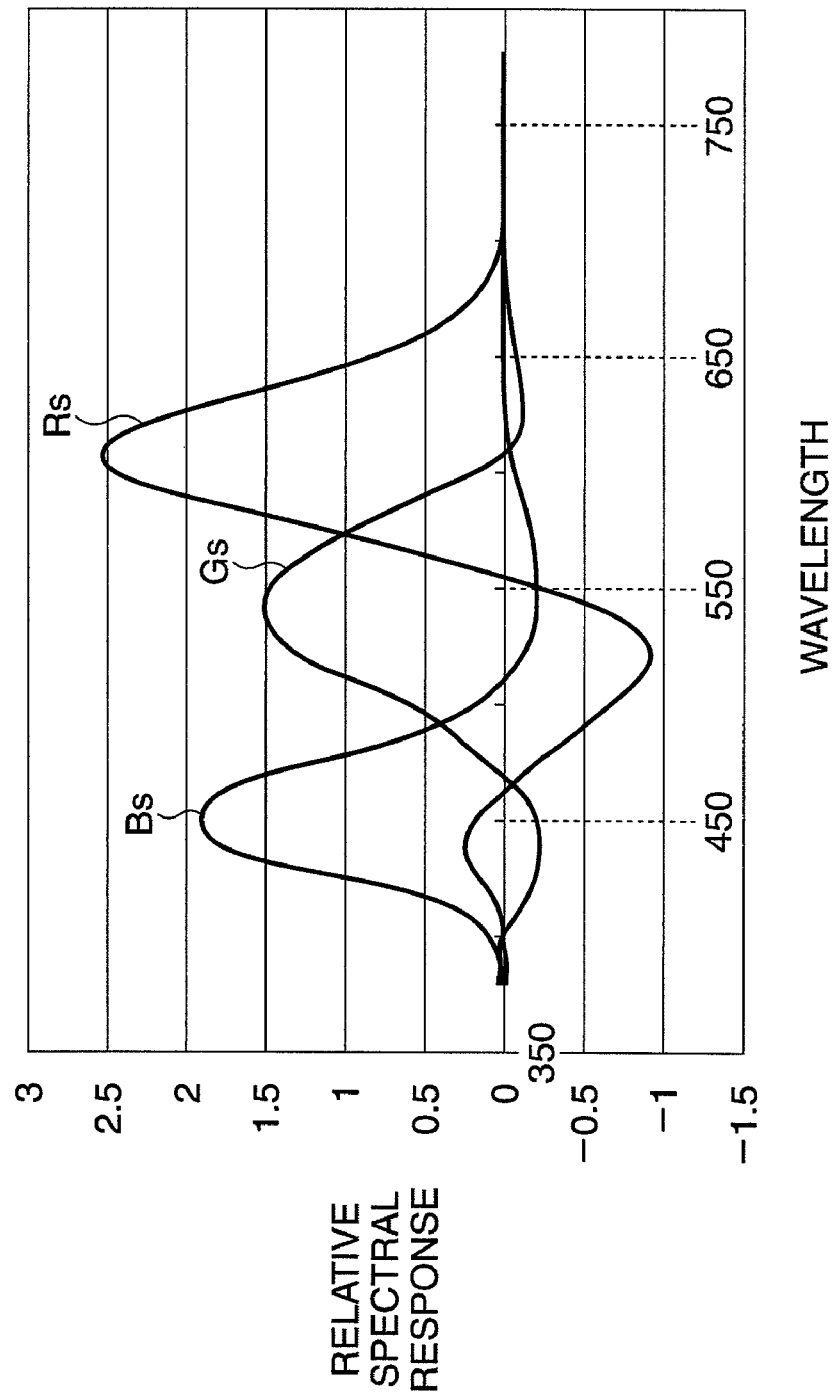
FIG. 4 is a view showing standard spectral response distribution properties of an imaging device.
Figure 5:
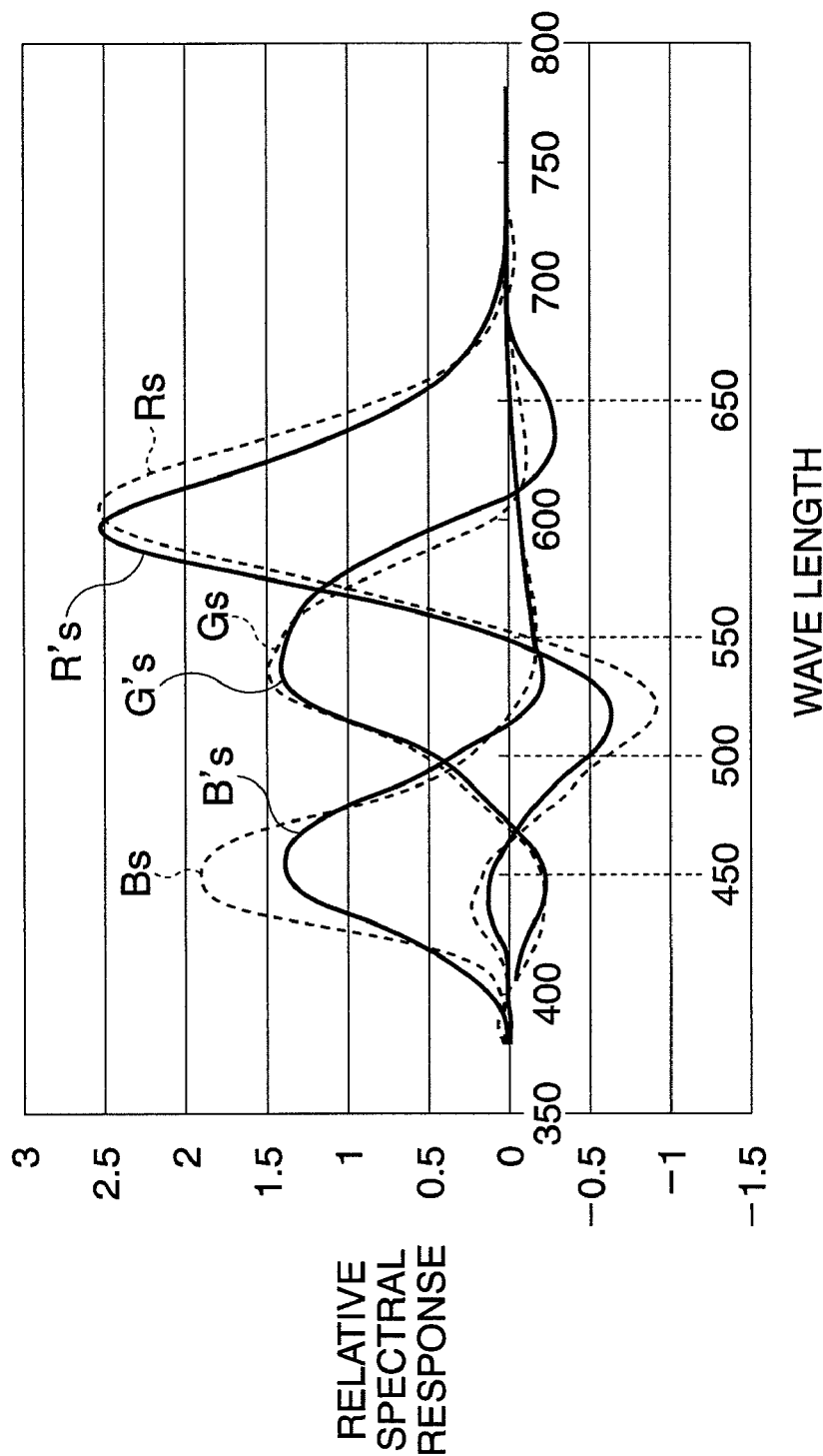
FIG. 5 is a view showing spectral response distributions of primary color signals obtained by a given color matrix.

FIG. 4 is a view showing the typical spectral response distribution properties of an imaging device. FIG. 5 is a view showing the spectral response distributions of primary color signals obtained with a given color matrix. The spectral response distributions are explained with reference to FIGS. 4 and 5 with reference to FIGS. 4 and 5.

The spectral response distribution properties shown in FIG. 4 are the ideal distribution properties for reproducing target colors, and correspond to the color-matching functions that are deemed to represent human visual sensitivity or perception, based on colorimetry. Herein, three curves corresponding to the color-matching functions are designated Rs, Gs, and Bs. The spectral response distribution properties shown in FIG. 4 generate colorimetric values independent of the spectral response characteristics of the imaging device according to the digital camera 10; in other words, they generate so-called "Device-Independent Color". Note that the spectral-response distribution shown in FIG. 4 is herein based on the sRGB color space.

To obtain Device-Independent Color, the series of color signals $R_{in}$, $Z_{in}$, $X_{in}$, and $B_{in}$, which are obtained based on the spectral response distribution properties shown in FIG. 3 and respectively correspond to the color elements R0, Z, X, and B0, are subjected to a matrix computation in the matrix circuit 25. The matrix computation is based on the following three formulae.

$$\begin{bmatrix} R_{out} \\ G_{out} \\ B_{out} \end{bmatrix} = \begin{bmatrix} 2.906 & -0.173 & -0.453 & 0.027 \\ -0.474 & 1.0 & 0.283 & -0.075 \\ -0.024 & -0.053 & -0.153 & 0.769 \end{bmatrix} \begin{bmatrix} R_{in} \\ Z_{in} \\ X_{in} \\ B_{in} \end{bmatrix} \quad (1)$$

$$\begin{bmatrix} R_{out} \\ G_{out} \\ B_{out} \end{bmatrix} = \begin{bmatrix} 2.968 & -0.169 & -0.459 & 0.023 \\ -0.409 & 1.0 & 0.273 & -0.075 \\ -0.049 & -0.040 & -0.152 & 0.784 \end{bmatrix} \begin{bmatrix} R_{in} \\ Z_{in} \\ X_{in} \\ B_{in} \end{bmatrix} \quad (2)$$

$$\begin{bmatrix} R_{out} \\ G_{out} \\ B_{out} \end{bmatrix} = \begin{bmatrix} 2.851 & -0.144 & -0.442 & 0.018 \\ -0.430 & 1.0 & 0.265 & -0.077 \\ -0.040 & -0.044 & -0.148 & 0.762 \end{bmatrix} \begin{bmatrix} R_{in} \\ Z_{in} \\ X_{in} \\ B_{in} \end{bmatrix} \quad (3)$$

The three color signals $R_{out}$, $G_{out}$, and $B_{out}$, generated by the matrix operation, correspond to the tristimulus values X, Y, Z obtained by the color-matching function. Considering the spectral-distribution properties of various objects, three 4×3 color matrices M1, M2, and M3 are herein selected in advance. The first matrix M1, the second matrix M2, and the third matrix M3 are respectively used in equations (1), (2), and (3). Each matrix coefficient is set to a given value so as to meet the so called "rooter condition" that correctly reproduces an objective color as closely as possible.

In the matrix M1 shown in equation (1), spectral power is relatively high in the short wavelength range of the spectral distribution property. Namely, the first matrix M1 is suitable for a bluish subject. On the other hand, the second matrix M2 has a relatively high spectral value in the long wavelength range, and thus it is applied to a reddish object. As can be seen from equations (1) and (2), the second row the first column coefficient value of the matrix M1 (=−0.474) is lower than that of the matrix M2 (=−0.409). The third matrix M3 is applied to a medium color-range object that is different from a reddish/bluish object.

FIG. 5 shows the spectral-sensitivity curves R's, G's, and B's, which are obtained by the matrix computation using the first matrix M1. As shown in FIG. 5, in the short wavelength range (450 nm to 550 nm), the spectral sensitivity curves R's, G's, and B's generally coincide with the standard spectral sensitivity curves Rs, Gs, and Bs determined by the sRGB color space. In other words, the color of the bluish object is accurately reproduced in the image.

On the other hand, in the case of the second matrix M2, the spectral-distribution curves in the long wavelength range generally coincide with the standard spectral-sensitivity curves Rs, Gs, and Bs (not shown). Namely, the color of the reddish object is adequately reproduced.

Figure 6:
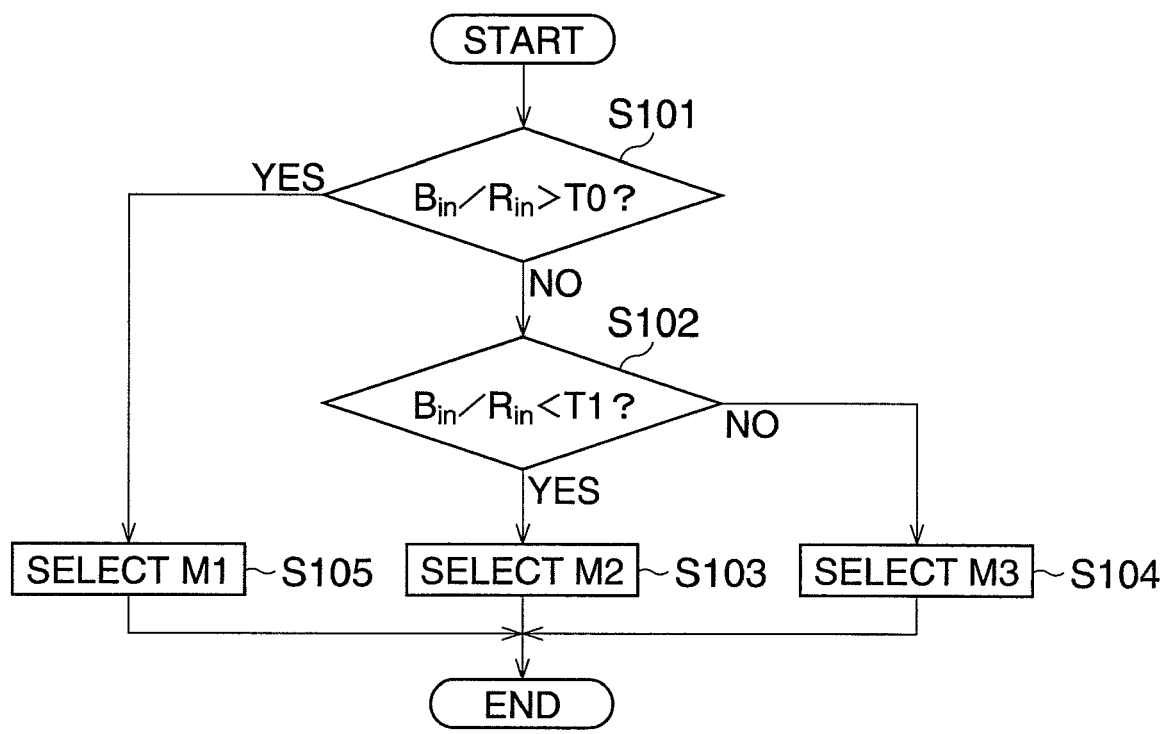
FIG. 6 is a flowchart of a matrix-selection process performed by the matrix-selection circuit.

FIG. 6 is a flowchart of the matrix-selection process performed by the matrix-selection circuit 23.

In Step S101, it is determined whether the ratio of color signal $B_{in}$ to color signal $R_{in}$ is larger than a threshold value T0. When a photographed object has spectral-distribution properties in which values of spectral components in the short wavelength range, corresponding to the color Blue, are relatively large, the value of color signal $B_{in}$ is larger than that of color signal $R_{in}$. The threshold value T0 is herein set to 1.1.

When it is determined that the ratio $B_{in}/R_{in}$ is larger than the threshold value T0, the process moves to Step S105. In Step S105, control signals are output from the matrix-selection circuit 23 to the matrix circuit 25 such that the first matrix M1 is selected in the matrix circuit 25. Thus, the matrix computation using the first matrix M1 is carried out. On the other hand, when it is determined that the ratio $B_{in}/R_{in}$ is not larger than the threshold value T0, the process goes to Step S102.

In Step S102, it is determined whether the ratio of color signal $B_{in}$ and color signal $R_{in}$ is smaller than a threshold value T1. When an object has a spectral distribution property in which values of spectral components in the long wavelength range, corresponding to the color red, are relatively large, the value of color signal $R_{in}$ is relatively larger than that of color signal $B_{in}$. The threshold value $T_{in}$ is herein set to 0.59.

When it is determined that the ratio $B_{in}/R_{in}$ is smaller than the threshold value T1, the process goes to Step S103. In Step S103, the matrix M2 is selected so that the matrix computation using the matrix M2 is carried out. On the other hand, when it is determined that the ratio $B_{in}/R_{in}$ is not smaller than the threshold value T1, the process goes to Step S104. In Step S104, the matrix M3 is selected. Note that the threshold values T0 and T1 are predetermined on the basis of spectral-distribution curves Rs and Bs, the values of matrix coefficients, and other words. The matrix operation using the selected matrix is carried out in each block.

In this manner, in the first embodiment, the spectral-distribution properties of the photographed object are detected on the basis of the color signals $R_{in}$ and $B_{in}$ in the matrix selection circuit 23. Then, in the matrix circuit 23, one color matrix suitable for the detected spectral-distribution properties is selected from the three matrices M1, M2, and M3, and the matrix computation for a color conversion is carried out using the selected matrix.

Figure 7:
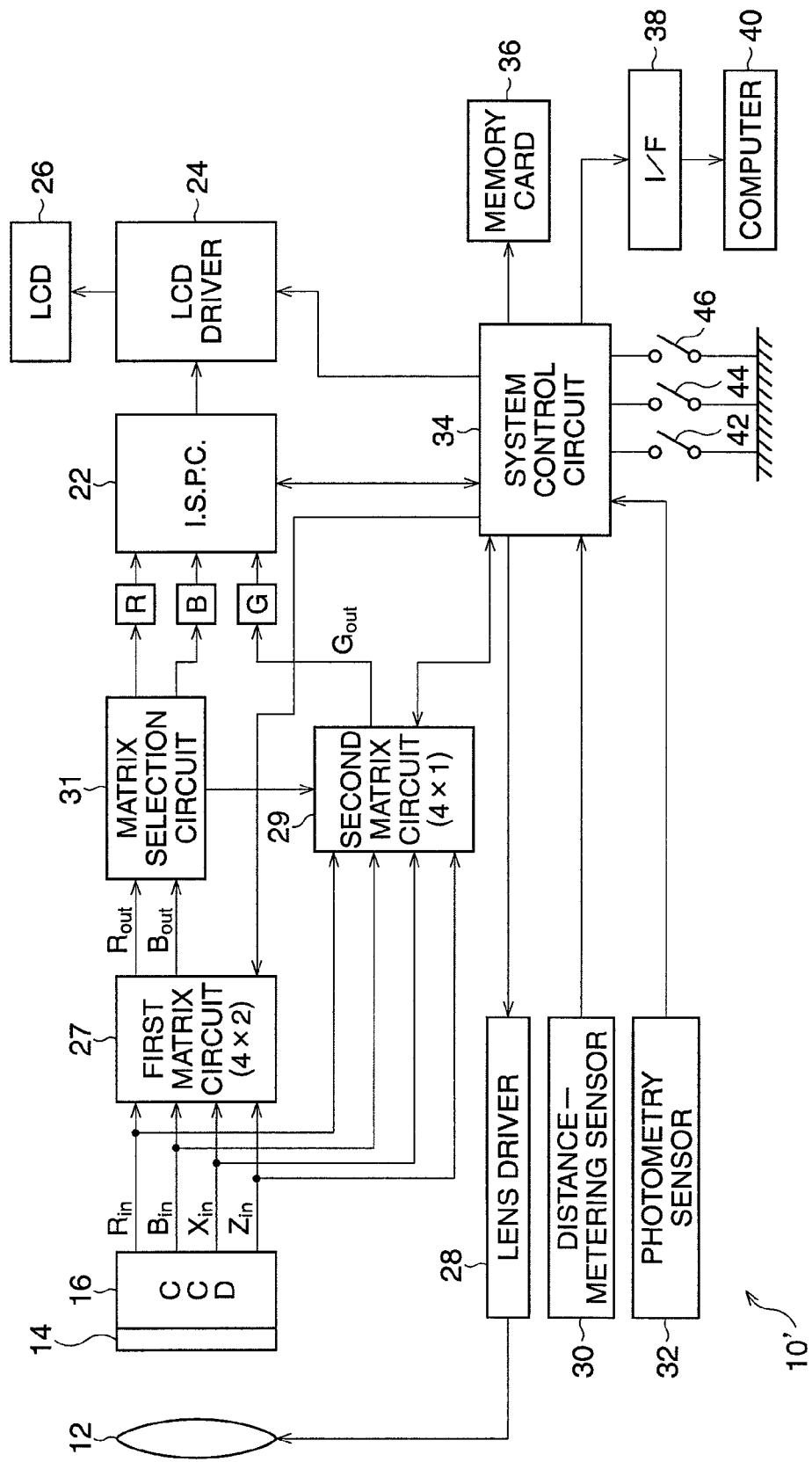
FIG. 7 is a block diagram of a digital camera according to the second embodiment.
Figure 8:
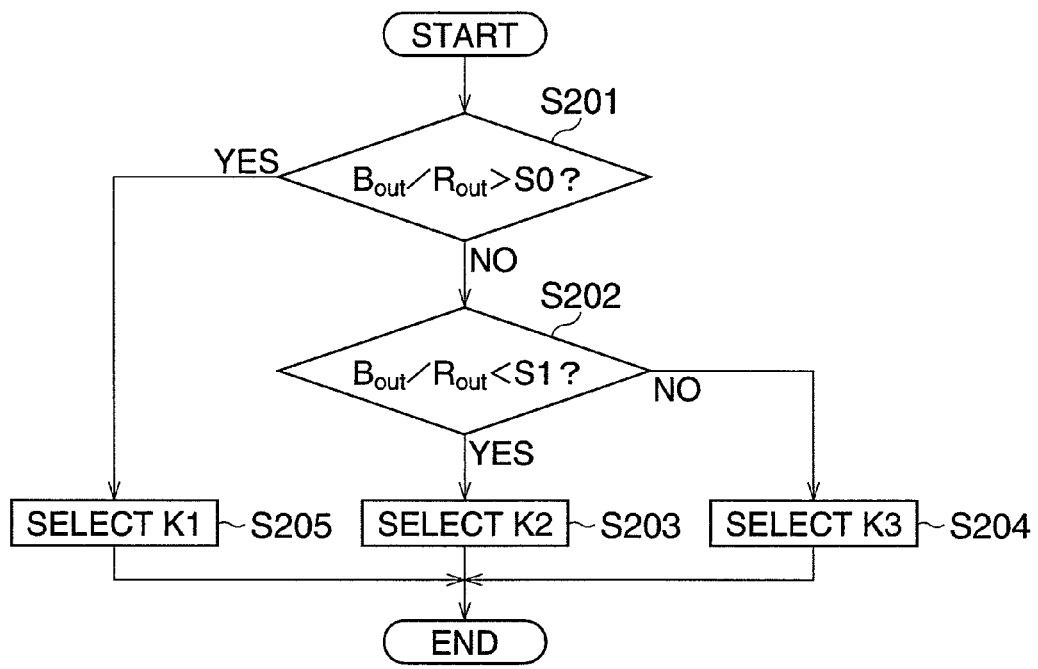
FIG. 8 is flowchart of a matrix-selection process according to the second embodiment.

With reference to FIGS. 7 and 8, the second embodiment is explained. The second embodiment is different from the first embodiment in that two color signals corresponding to the color Red and Blue are first obtained using a predetermined color matrix, and the remaining color signal corresponding to the color Green is subsequently obtained by using a selected color matrix. Other constructions are substantially the same as those of the first embodiment.

FIG. 7 is a block diagram of a digital camera according to the second embodiment. Constructions corresponding to those according to the first embodiment are represented by the same reference numbers.

The digital camera 10' has a first matrix circuit 27, a second matrix circuit 29, and a matrix-selection circuit 31. The series of color signals $B_{in}$, $R_{in}$, $X_{in}$, and $Z_{in}$ generated in the CCD 16 are output to the first and second matrix circuits 27 and 29. As shown in the following equation, the first matrix circuit 27 carries out a 4×2 matrix computation on the series of image-pixel color signals $B_{in}$, $R_{in}$, $X_{in}$, and $Z_{in}$. Consequently, color signals $R_{out}$ and $B_{out}$ that constitute the primary color signals R and B are output from the first matrix circuit 27 to the matrix selection circuit 31.

$$\begin{bmatrix} R_{out} \\ B_{out} \end{bmatrix} = \begin{bmatrix} 2.851 & -0.144 & -0.442 & 0.018 \\ -0.040 & -0.044 & -0.148 & 0.762 \end{bmatrix} \begin{bmatrix} R_{in} \\ Z_{in} \\ X_{in} \\ B_{in} \end{bmatrix} \quad (4)$$

In the matrix-selection circuit 31, the spectral-distribution property of the object is detected on the basis of the color signals $R_{out}$ and $B_{out}$. Then, control signals are output from the matrix-selection circuit 31 to the second matrix circuit 29 on the basis of the detected spectral-distribution properties. In the second matrix circuit 31, based on a color matrix suitable for the detected spectral-distribution property of the object, a 4×1 matrix computation is carried out on the series of image-pixel color signals $B_{in}$, $R_{in}$, $X_{in}$, and $Z_{in}$. Thus, color signal components corresponding to color G are generated. Herein, three color matrices are stored in a register of the second matrix circuit 29 in advance.

FIG. 8 is a flowchart of the matrix-selection process according to the second embodiment.

In Step S201, it is determined whether the ratio of the color signal $B_{out}$ and the color signal $R_{out}$ is larger than a threshold value S0. When a photographed subject has a spectral distribution property in which values of spectral components in the short wavelength range, corresponding to the color blue, are relatively large, the value of color signal $B_{out}$ is larger than that of color signal $R_{out}$. When it is determined that the ratio $B_{out}/R_{out}$ is larger than the threshold value S0, the process moves to Step S205. In Step S205, control signals are output from the matrix-selection circuit 31 to the second matrix circuit 29 such that a first matrix K1 is selected in the second matrix circuit 29. Thus, the matrix computation shown in the following equation is carried out.

$$[G_{out}] = [-0.474 \quad 1.0 \quad 0.283 \quad -0.075] \begin{bmatrix} R_{in} \\ Z_{in} \\ X_{in} \\ B_{in} \end{bmatrix} \quad (5)$$

On the other hand, when it is determined that the ratio $B_{out}/R_{out}$ is not larger than the threshold value S0, the process goes to Step S202. In Step S202, it is determined whether the ratio of the color signal $B_{out}$ to the color signal $R_{out}$ is lower than a threshold value S1. When an object has a spectral distribution property in which values of spectral components in the long wavelength range, corresponding to the color Red, are relatively large, the value of color signal $R_{out}$ is relatively larger than that of color signal $B_{out}$.

When it is determined that the ratio $B_{out}/R_{out}$ is lower than the threshold value S1, the process goes to Step S203. In Step S203, control signals are output to the second matrix circuit 29 such that a second matrix K2 is selected. Thus, the matrix computation shown in the following equation is carried out.

$$[G_{out}] = [-0.409 \quad 1.0 \quad 0.273 \quad -0.075] \begin{bmatrix} R_{in} \\ Z_{in} \\ X_{in} \\ B_{in} \end{bmatrix} \quad (6)$$

On the other hand, when it is determined that the ratio $B_{out}/R_{out}$ is not lower than the threshold value S1, the process moves to Step S204. In Step S204, control signals are output to the second matrix circuit 29 such that a third matrix K3 is selected. Thus, the matrix computation shown in the following equation is carried out.

$$[G_{out}] = [-0.430 \quad 1.0 \quad 0.265 \quad -0.077] \begin{bmatrix} R_{in} \\ Z_{in} \\ X_{in} \\ B_{in} \end{bmatrix} \quad (7)$$

Note that the threshold values S0 and S1 are predetermined on the basis of the spectral-distribution curves Rs and Bs, the values of matrix coefficients, and so on.

In this way, in the second embodiment, the "4×2" matrix operation is carried out in the first matrix circuit 27 to generate the color signals $R_{out}$ and $B_{out}$; namely, the R and B color signals of the R, G, and B primary color signals. Then, the matrix-selection circuit 31 detects the spectral distribution properties of the object on the basis of the color signals $R_{out}$ and $B_{out}$. In the second matrix circuit 29, the 4×1 matrix operation using the selected matrix is carried out to generate G color signal components.

Another type of color filter having at least four color elements may be applied instead of the above color filter 14. Also, an imaging process method using four color filters may be applied instead of the above imaging process using one color filter. A different color space, such as the La*b* color space Lu*v* color space, or the XYZ system may also be used.

The matrix computation, (i.e., the color conversion process) may be carried out by a software program. A video camera, or other electronic equipment with a photographing function, such as a cellular phone, may be implemented.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2006-263291 (filed on Sep. 27, 2006), which is expressly incorporated herein by reference, in its entirety.

The invention claimed is:

1. An imaging device comprising:
   an image sensor;
   a color filter that is located on said image sensor and has at least four color elements, wherein:
      two color elements of the at least four color elements respectively correspond to the colors Red and Blue,
      two color elements of the at least four color elements each correspond to the color Green,
      each of said at least four color elements respectively have different spectral transmission properties, and
      a series of color signals correspond to the at least four color elements are read from said image sensor;
   a matrix-selection processor that detects the spectral distribution properties of an object included in the series of color signals based on a maximum of two color signals, namely Red and Blue color signals, and that selects one color matrix corresponding to the detected spectral-distribution properties from a plurality of color matrices, the plurality of color matrices corresponding to objects that respectively have different spectral distribution properties; and a color conversion processor that generates R, G, and B primary color signals from the series of color signals by a color-conversion process using the selected color matrix, and that carries out a matrix computation on the entire series of color signals based on the selected color matrix.

2. The imaging device of claim 1, wherein said matrix-selection processor detects the spectral-distribution properties on the basis of a part of the series of color signals.

3. The imaging device of claim 1, wherein the spectral-response distribution properties of said imaging device are determined such that the peak wavelength of any spectral-response distribution curve and the peak wavelength of its adjacent spectral-response distribution curve are spaced at regular intervals.

4. The imaging device of claim 1, wherein the color filter has four color elements.

5. The imaging device of claim 1, wherein the plurality of color matrices includes a first color matrix that corresponds to an object having spectral distribution properties in which spectral power is relatively large in the short wavelength range including blue light, and a second color matrix that corresponds to an object having spectral distribution properties in which spectral power is relatively large in the long wavelength range including red light.

6. The imaging device of claim 1, wherein the matrix-selection processor detects the spectral distribution properties of the object based on a ratio of the Blue color signal to the Red color signal.

7. An apparatus for converting color signals comprising:
a spectral distribution property detector that detects the spectral distribution property of an object that is included in a series of color signals based on a maximum of two color signals, namely Red and Blue color signals, the series of color signals being read from an image sensor with a color filter that is located on said image sensor, said color filter having at least four color elements, wherein two color elements of the at least four color elements respectively correspond to the colors Red and Blue, wherein two color elements of the at least four color elements each correspond to the color Green, and wherein each of the at least four color elements respectively have different spectral transmission properties;
a matrix selector that selects one color matrix corresponding to the detected spectral-distribution properties from a plurality of color matrices, the plurality of color matrices corresponding to objects that respectively have different spectral-distribution properties; and
a color conversion processor that generates R, G, and B primary color signals from the series of color signals by a color-conversion process using the selected color matrix, and that carries out a matrix computation on the entire series of color signals based on the selected color matrix.

8. A method for converting color signals comprising:
detecting the spectral distribution properties of an object that is included in a series of color signals based on a maximum of two color signals, namely Red and Blue color signals, the series of color signals being read from an image sensor with a color filter that is located on said image sensor, said color filter having at least four color elements, wherein two color elements of the at least four color elements respectively correspond to the colors Red and Blue, wherein two color elements of the at least four color elements each correspond to the color Green, and wherein each of said at least four color elements respectively have different spectral transmission properties;
selecting one color matrix corresponding to the detected spectral distribution properties from a plurality of color matrices, the plurality of color matrices corresponding to objects that respectively have different spectral distribution properties;
generating R, G, and B primary color signals from the series of color signals by a color-conversion process using the selected color matrix; and
performing a matrix computation on the entire series of color signals based on the selected color matrix.

9. An imaging device comprising:
an image sensor;
a color filter located on said image sensor and having at least four color elements which respectively have different spectral transmission properties, a series of color signals corresponding to the at least four color elements being read from said image sensor;
a color conversion processor which generates R and B primary color signals from the series of color signals by a color-conversion process, and
a matrix-selection processor which detects the spectral distribution properties of an object included in the series of color signals, and which selects one color matrix corresponding to the detected spectral-distribution properties from a plurality of color matrices based on a maximum of two generated primary color signals, namely the generated R and B primary color signals, the plurality of color matrices each corresponding to objects which respectively have different spectral distribution properties,
wherein the a color conversion processor generates a G primary color signal, which is the remaining primary color signal, from the series of color signals by the color-conversion process using the selected color matrix.

10. The imaging device of claim 9, wherein the matrix-selection processor detects the spectral distribution properties of the object based on a ratio of the B primary color signal to the R primary color signal.

* * * * *